United States Patent [19]
Simionato

[11] Patent Number: 5,737,904
[45] Date of Patent: Apr. 14, 1998

[54] ASSEMBLY OF WEIGHING BUCKETS IN A PACKAGING MACHINE

[75] Inventor: Paolo Simionato, Padova, Italy

[73] Assignee: Simionato S.p.A., Mestrino, Italy

[21] Appl. No.: 655,869

[22] Filed: May 31, 1996

[30] Foreign Application Priority Data

Jun. 8, 1995 [IT] Italy ................... MI95A1218

[51] Int. Cl.$^6$ ................ B65B 1/32; B65B 35/12; B65B 39/00

[52] U.S. Cl. .................. 53/502; 53/248; 53/260

[58] Field of Search ............... 53/502, 248, 260, 53/255, 245, 244

[56] References Cited

U.S. PATENT DOCUMENTS

| | | | |
|---|---|---|---|
| 2,950,894 | 8/1960 | Hillman | 53/502 X |
| 3,696,584 | 10/1972 | Rickard | 53/502 X |
| 4,606,475 | 8/1986 | Usagawa | 53/502 X |
| 4,813,205 | 3/1989 | Mikata et al. | 53/502 X |
| 5,050,370 | 9/1991 | Stederoth | 53/502 |
| 5,340,269 | 8/1994 | Caridis et al. | 53/502 X |

FOREIGN PATENT DOCUMENTS

| | | |
|---|---|---|
| 0 075 479 | 3/1983 | European Pat. Off. . |
| 0 109 844 | 5/1984 | European Pat. Off. . |
| 0 140 624 | 5/1985 | European Pat. Off. . |

*Primary Examiner*—James F. Coan
*Attorney, Agent, or Firm*—Young & Thompson

[57] ABSTRACT

Assembly of buckets for weighing a product in a machine for packaging said product, including at least a first and a second row of buckets, wherein each bucket of a row is in communication for the downward passage of the product with a corresponding bucket of the other row. In the assembly of buckets each of the buckets has a slanted surface for sliding of the product and the buckets of the rows of buckets in respective communication for the passage of the product are positioned to convey the product along a downwardly conveying path comprising the sliding surfaces of the corresponding buckets, so that relevant vertical fallings of the product are avoided.

7 Claims, 3 Drawing Sheets

ASSEMBLY OF WEIGHING BUCKETS IN A PACKAGING MACHINE

FIELD OF THE INVENTION

The present invention relates to an assembly of buckets for weighing the product in a machine for packaging a loose product or one which is in pieces, of the type comprising at least a first and a second row of buckets, wherein each bucket of a row is in communication for the downward passage of the product with a corresponding bucket of the other row.

BACKGROUND OF THE INVENTION

Assemblies of buckets of the type referred to above have already been used for some time in automatic bagging or packaging machines. According to a known configuration, the buckets have a lower unloading opening closed by one or two tilting doors which open on command of suitable means to allow the material to fall into the corresponding bucket of the lower row of buckets or into a lower funnel-shaped collection element which collects the material and conveys it to the underlying packaging zone. According to a known arrangement, the corresponding buckets, which unload the material one into the other, are perfectly aligned vertically one above the other and the material released by one of these falls from a considerable height into the one below, hitting with notable force the doors of the bucket below.

This fact is extremely disadvantageous for some types of material to be packaged, for example food products in general such as biscuits, sweets of various types and others, which may, following the impact, break and/or splinter and thus become unusable for sale, with serious economic damage for the manufacturing firms.

SUMMARY OF THE INVENTION

The object of the present invention is that of providing an assembly of weighing buckets in a packaging machine which overcomes the present disadvantages in the traditional bucket arrangements and more particularly that of providing an assembly of weighing buckets whereby also fragile products, such as for example the aforementioned biscuits and various types of sweets or others, may be treated in view of their packaging, without damage being caused which forces rejection of a large quantity of the products to be packaged.

This object is achieved by providing an assembly of buckets for weighing a product in a machine for packaging said product, including at least a first and a second row of buckets, wherein each bucket of a row is in communication for the downward passage of the product with a corresponding bucket of the other row; in which each of said buckets has a slanted surface for sliding of the product; and in which the buckets of the rows of buckets in respective communication for the passage of the product are positioned to convey the product along a downwardly conveying path comprising said sliding surfaces of the corresponding buckets, so that relevant vertical fallings of the product are avoided.

In this way, in fact, the product to be packaged is not fed by one bucket to the other through vertical falling as occurred according to the prior art, but is contrarily forced to slide downwards along successive slanted surfaces which accompany it in its sliding without it being subjected to impact and thus without being damaged when moving from one bucket to the other.

BRIEF DESCRIPTION OF DRAWINGS

The present invention will be made clearer on reading of the following description, relating to a preferred embodiment of the invention, to be read with reference to the accompanying drawings, in which.

Figure 1:
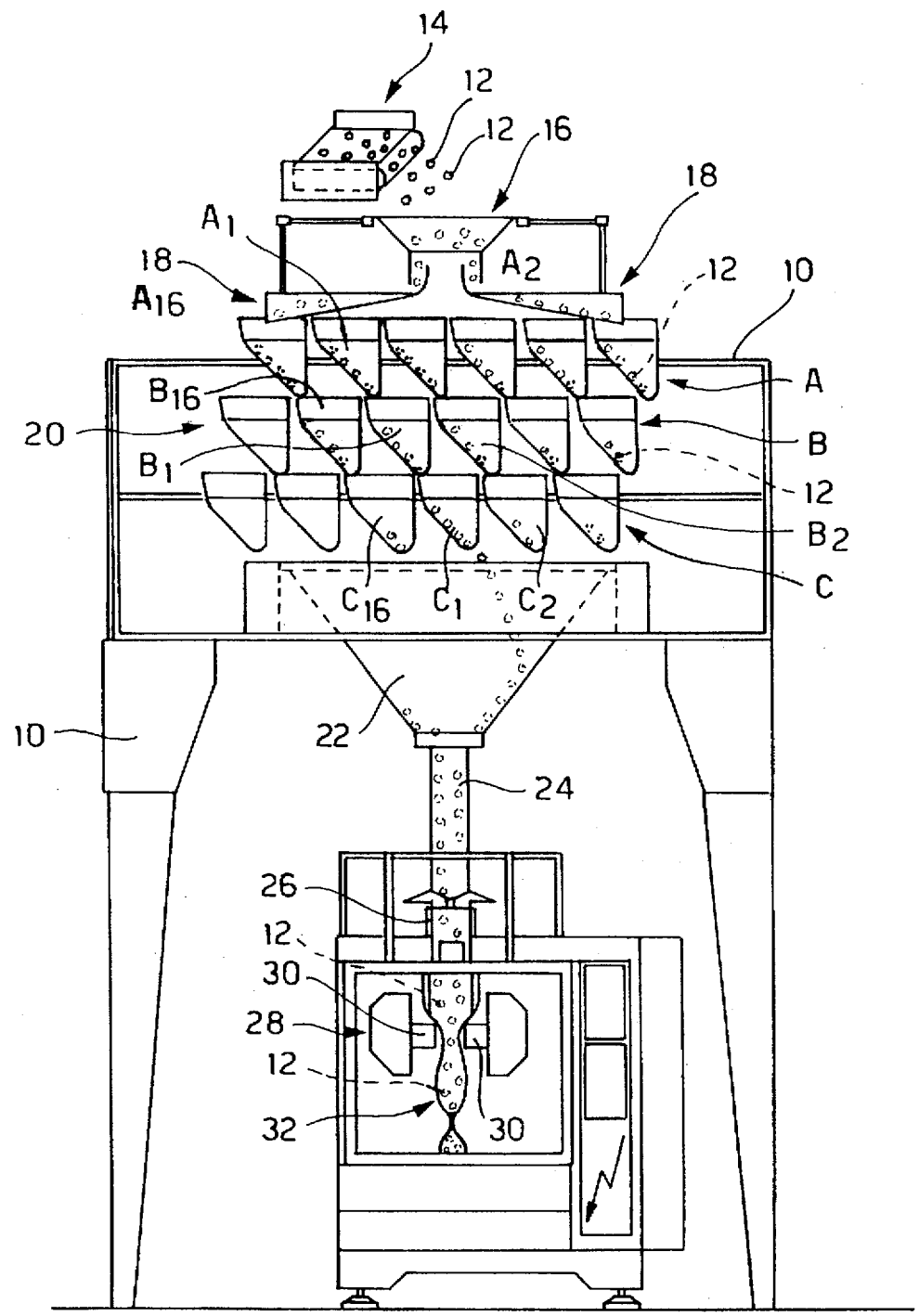
FIG. 1 is an elevational view of a packaging machine using a preferred embodiment of the assembly of buckets of the present invention.

DESCRIPTION OF A PREFERRED EMBODIMENT OF THE INVENTION 10 in FIG. 1 denotes the support framework of a generical machine for packaging a product 12 in pieces, which product is fed from above by means of a conveyor belt 14 or other and passed into an upper feed hopper 16 of the machine wherefrom it is transferred, via suitable channels 18, to the weighing section 20, comprising the assembly of buckets of the present invention.

The packaging machine has, in series with the weighing section 20, a funnel-shaped collection element 22 which conveys the weighed portions of product into a special pipe 24 outside of which a tubular strip 26 in a heat-sealable material is made to run in the zone below it.

The pipe 24 intermittently fills the tubular strip 26 with predefined portions of product, while a sealing unit 28, comprising opposed welding plates 30, welds the opposite edges of said strip 26 providing individual packages or bags 32 containing a predefined portion of the product 12.

Figure 2:
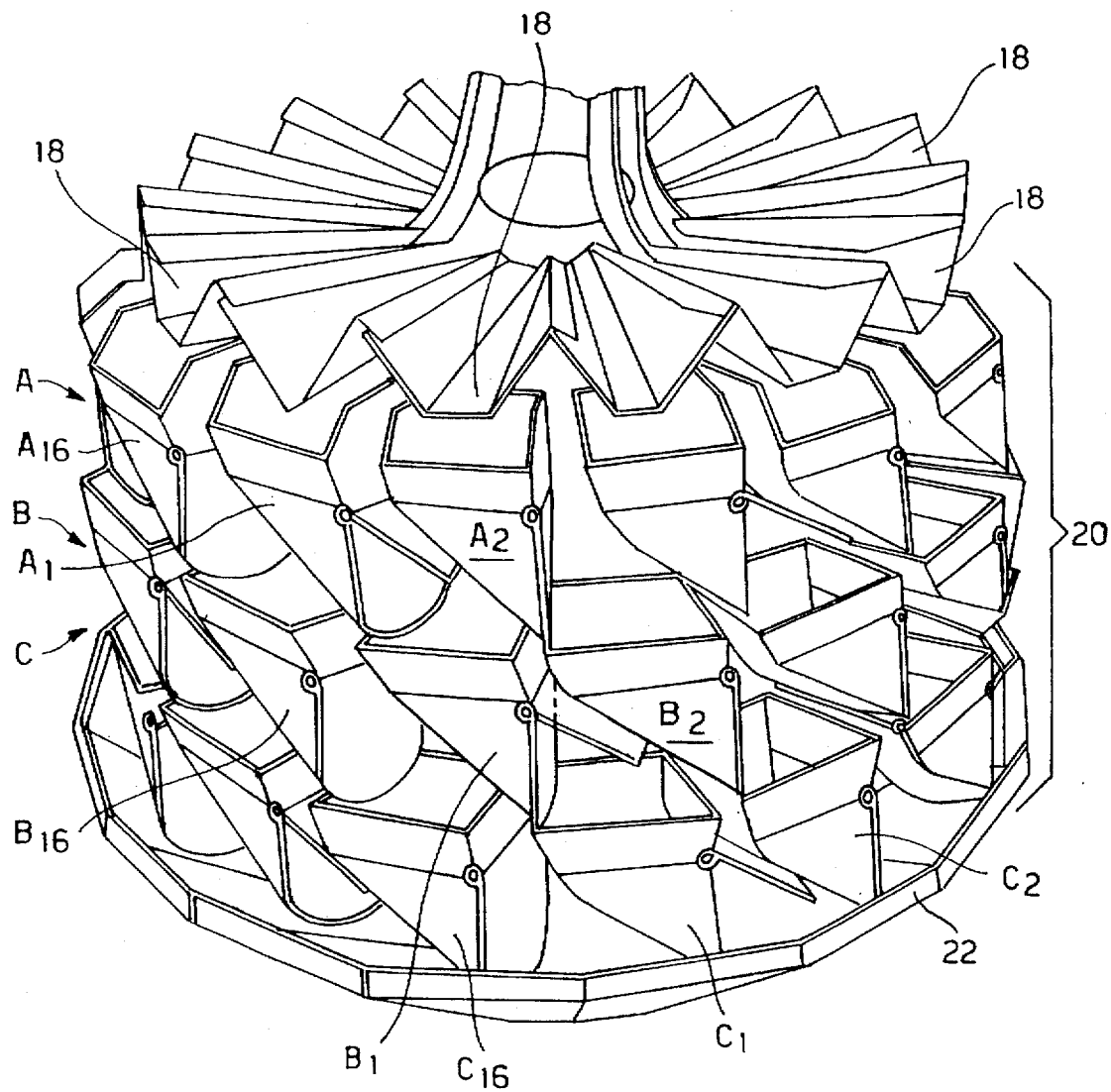
FIG. 2 is a perspective view of the preferred embodiment of the assembly of buckets of the present invention.

With reference also to the following FIG. 2, which shows only the channels 18, the funnel-shaped collection element 22 and the assembly of buckets 20 of the present invention positioned between them, it can be seen that in the preferred embodiment shown here said assembly of buckets has a first upper row of buckets, denoted by A, relating to buckets of prebatched material, a second intermediate row of buckets, denoted by B, relating to actual weighing buckets and a third lower row of buckets, denoted by C, relating to auxiliary buckets used for calculating the combinations of weights in view of forming the portion of predefined weight to be packaged.

As indicated in the preferred embodiment shown here, the buckets of each row of the assembly of buckets 20 are arranged along horizontal circular lines in a number equal to 16 for each row. They may however consist of any number of elements, as also they could in principle be arranged on polygonal, non-circular lines, or those of another kind.

Moreover it should be noted that the number of rows of buckets present in the weighing section 20 could also be different from the three of the preferred embodiment shown here. In some weighing sections two rows of buckets could in fact be used or, albeit improbably, more than the three rows of the preferred embodiment shown.

As shown in the figures, each bucket of the upper row unloads the material into a respective bucket of the lower row. For example bucket A1 of the upper row A unloads the material into the bucket B1 of the intermediate row B, which in turn unloads into the bucket C1 of the lower row C which unloads into the funnel-shaped collection element 22. For convenience of description, we shall define the assembly of the three buckets A1, B1, C1 as the first weighing series;

sixteen weighing series are foreseen in the preferred embodiment shown here.

In the figures, in order not to complicate the drawings excessively, in addition to the first weighing series only the weighing series consisting of buckets A2, B2, C2 and A16, B16 and C16 are indicated.

Figure 3:
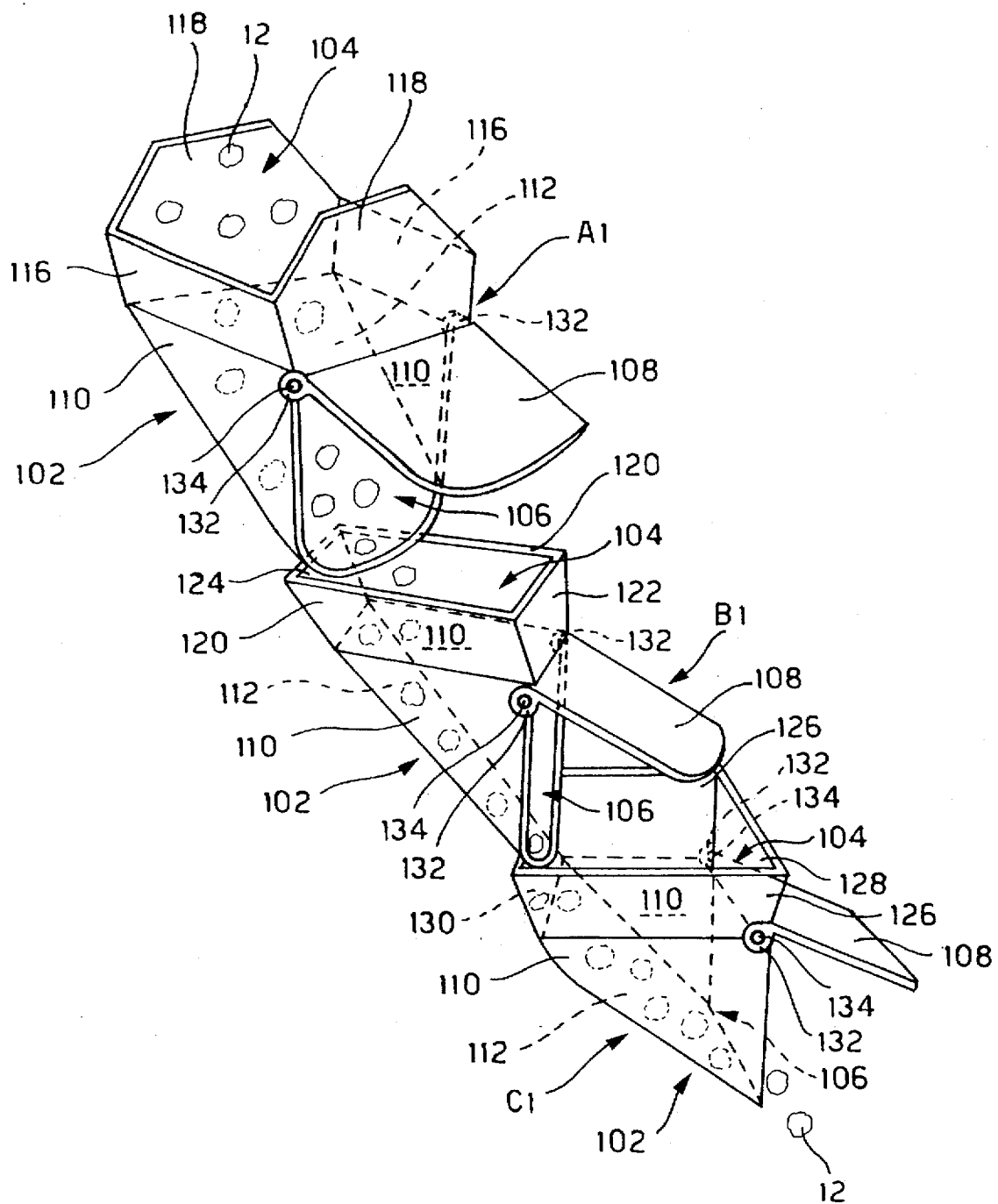
FIG. 3 is a perspective view of a single series of weighing buckets of the preferred embodiment of the assembly of buckets of the present invention.

As shown more clearly in FIG. 3, each of said buckets A1, B1 and C1 of the first weighing series (the same observations apply to the other series of buckets) have a respective hollow box-shaped body 102 of a general wedge shape and with an upper opening 104 for feeding the material, and a lower opening 106 for unloading the material, closed by a tilting door 108 which can be opened for unloading the material contained in the bucket.

The hollow box-shaped body 102 of each bucket is made in metal sheet and has substantially triangular lateral walls 110 and a slanted back wall 112 which defines a slanted surface for the support and sliding of material.

Said slanted surface for sliding 112 ends below at said opening for unloading the material 106 provided in a front vertical wall of the box-shaped body.

The abovementioned walls of the box-shaped body of each bucket extend above with short peripheral walls bordering in their interior said feed opening 104.

In bucket A1, like the other buckets in its row, rectangular lateral walls 116 are provided and front and rear end walls 118 with a generally hexagonal shape, with the upper edge of said front and rear walls 118 extending higher than the upper edge of the lateral walls 116. Overall, walls 116 and 118 of the bucket A1 are slightly flared upwards.

In bucket B1, like the other buckets in its row, lateral walls 120 and front and rear end walls 122, 124 respectively are provided, all with a generally rectangular shape. The lateral walls 120 and the rear wall 124 are flared upwards, while the front wall 122 is slanted inwards. The upper rear wall 124 is substantially slanted at the same angle as the back wall 112 of the corresponding bucket A1.

In the bucket C1, like the other buckets in its row, lateral walls 126 and front and rear end walls 128, 130 respectively, all with a generally rectangular shape, are provided. Said upper walls 126, 128, 130 are flared overall upwards with the rear wall 130 which is slanted substantially in the same way as the back wall 112 of the bucket B1.

The upper face inside the bucket of said rear walls 118, 124, 130 defines the upper part of the surface for support and sliding of the material of said buckets.

In the preferred embodiment shown here, said buckets A1, B1, C1 corresponding one to the other and their respective sliding surfaces, as also all the other corresponding buckets, are arranged along a substantially spiral line, with the respectively underlying buckets B1 and C1 which have their respective opening for feeding material 104 near the outlet opening 106 of the correspondingly upper bucket A1 and B1 respectively that is to say, as shown, with the lower front edge of each back wall 112 of the buckets A1 and B1 which extends inside the openings 106 of the bucket B1 and C1 respectively, remaining near the internal face of the respective short rear walls 124 and 130.

As shown, the tilting doors 108 for closure of each bucket have vertical perforated tabs 132 for attachment to the body of the bucket and which extend above the door, arranging themselves outside of the lateral walls 110 of the buckets. The holes of said attachment tabs are inserted over jointed pins 134 which extend outwards from the front upper vertex of said lateral walls 110.

Suitable means for controlling opening-closure of said doors 108 are provided but not shown in the figures.

This arrangement of the buckets of each weighing series along a spiral line allows the provision of an assembly of weighing buckets which, in addition to defining a route substantially without impact for the material, has extremely small overall dimensions, defining an assembly, substantially inscribable inside a cylinder, which does not occupy excessive spaces in working areas.

Should however said rows of buckets be ordered according to any alignment, it will be sufficient, in order to achieve the objects of the present invention, for the slanted surfaces for support and sliding of the material of the respectively upper buckets to be positioned so as to convey the material towards the respectively underlying element, in a peripheral direction of the assembly of buckets.

It is obviously understood that what has been written and shown in reference to the preferred embodiment of the present invention has been given purely by way of a non-limiting example of the principle claimed.

What is claimed is:

1. Assembly of buckets for weighing a product in a machine for packaging said product, including at least a first and a second and a third row of buckets, wherein each bucket of a row is in communication for the downward passage of the product with a corresponding bucket of the other row; in which each of said buckets has a slanted surface for sliding of the product; and in which the buckets of the rows of buckets in respective communication for the passage of the product are positioned to convey the product along a downwardly conveying path comprising said sliding surfaces of the corresponding buckets, the buckets of each row of buckets being aligned on respective circular lines, said sliding surfaces of the corresponding buckets of the rows of buckets being aligned with each other along a line in the form of a substantially cylindrical spiral, so that relevant vertical fallings of the product are avoided.

2. Assembly of buckets according to claim 1, wherein said corresponding buckets of the rows of buckets and their respective slanted sliding surfaces are positioned near to each other.

3. Assembly of buckets according to claim 1, wherein each of said buckets has an upper opening for feeding of the product and a lower opening for unloading the product, wherein said buckets of the lower row of buckets have their respective opening for feeding the product near the outlet opening of the corresponding bucket of the upper row of buckets.

4. Assembly of buckets according to claim 3, wherein the lower front edge of the upper bucket extends inside the opening for feeding the product of the bucket below remaining near the upper end of said surface for sliding of the product.

5. Assembly of buckets according to claim 3, wherein said buckets have a hollow box-shaped body and a vertical door in correspondence of said unloading opening which can be rotated for opening and unloading the product contained in the bucket.

6. Assembly of buckets according to claim 5, wherein the box-shaped body of each of said buckets has a general wedge shape.

7. Assembly of buckets for weighing a product in a machine for packaging said product, including at least a first and a second row of buckets, wherein each bucket of a row is in communication for the downward passage of the product with a corresponding bucket of the other row; in which each of said buckets has a slanted surface for sliding of the product; and in which the buckets of the rows of buckets in respective communication for the passage of the product are positioned to convey the product along a downwardly conveying path comprising said sliding surfaces of the corresponding buckets, said sliding surfaces of the corresponding buckets of the rows of buckets being aligned with each other, each said bucket having a hollow boxed shaped body with a vertical door that swings upward to permit discharge of said product from said sliding surface of one said bucket to the sliding surface of the next said bucket, so that relevant vertical fallings of the product are avoided.

* * * * *